Sept. 14, 1937.   G. TRÖMEL   2,093,176
TREATMENT OF RAW PHOSPHATES
Filed Jan. 25, 1935
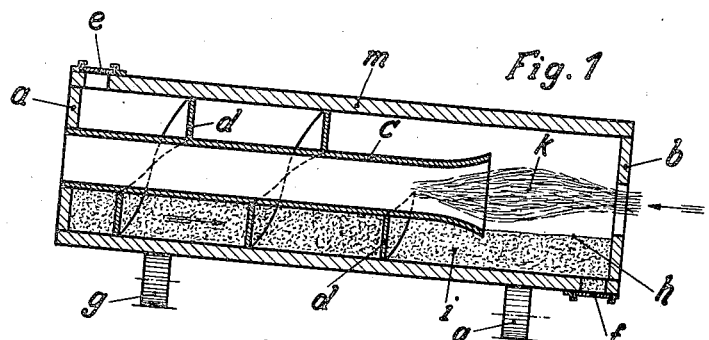
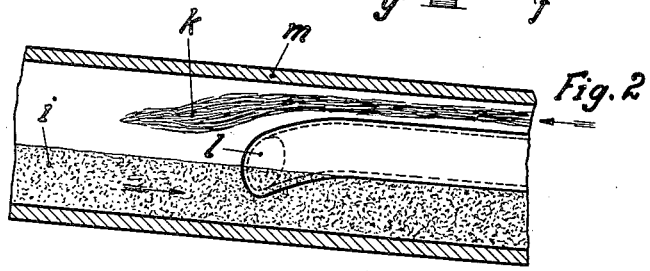
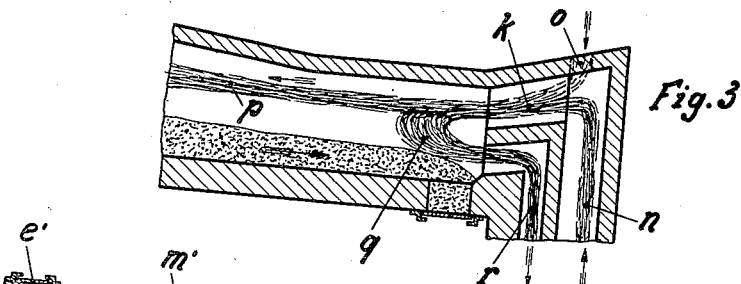
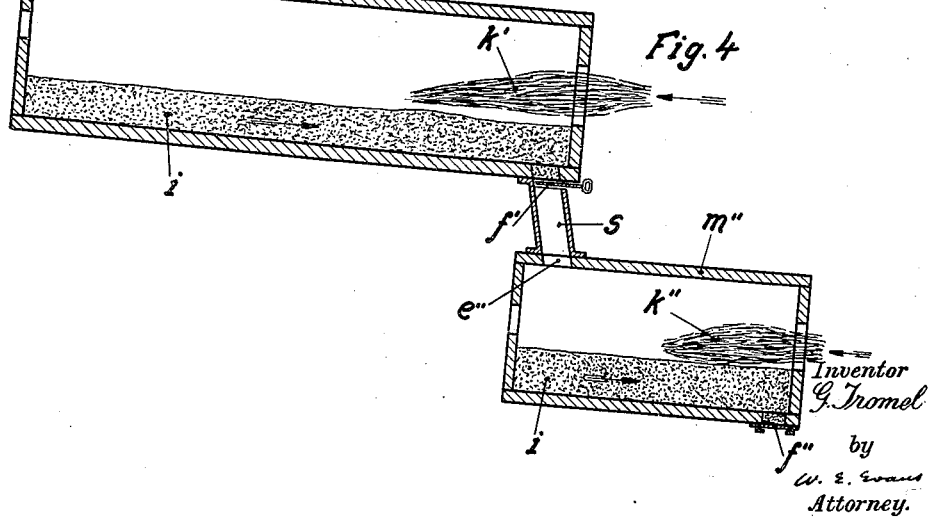
Inventor
G. Trömel
by
W. E. Evans
Attorney.

UNITED STATES PATENT OFFICE 2,093,176

TREATMENT OF RAW PHOSPHATES

Gerhard Trömel, Dusseldorf, Germany, assignor to Kaiser-Wilhelm-Institut für Eisenforschung (eingetragener Verein), Dusseldorf, Germany Application January 25, 1935, Serial No. 3,393
In Germany February 9, 1934

1 Claim. (Cl. 71—47)

In the raw phosphates, phosphorites, phosphate chalks or the like, the phosphoric acid occurs in the form of compounds of the apatite group. By the term "apatite" is meant a group of compounds of calcium phosphate, which lie according to their basicity between the tribasic and tetrabasic calcium phosphates and whose formation is effected by small quantities of fluorine, chlorine, hydroxyl, carbonate and others. These compounds are only slightly soluble and thus cause bad qualities in the raw phosphates as fertilizers.

Recent experiments have shown that the presence of fluorine, hydroxyl, and the like is clearly not produced by impurities in the natural minerals, indeed the fluorine particularly seems to constitute an important constituent of natural apatite, to which can be assigned the part of a central atom in accordance with Werner's formula of structure. It will be clear from this interpretation of the formula for the structure of apatite that on the one hand the removal of the fluorine alters the solubility of the products fundamentally, that is to say must improve it, but that on the other hand its removal involves great difficulties.

Hitherto two totally different methods have been employed for converting natural phosphate rocks into compounds of phosphorus, the phosphorus of which is present in a form in which it can be absorbed by plants as a fertilizer, the fluorine being partially removed as a by-product. One method is to decompose the natural rock by means of acids; in the other method the attempt has been made to convert the mineral into more easily soluble compounds, by heating to incandescence or melting it in the presence of suitable additional substances. Of the attempts made to decompose the mineral by the action of heat only one has so far been a practical success; this is the known manufacture of "Rhenania phosphate", in which the natural phosphate rock is decomposed by the addition of very considerable quantities of alkali or magnesium compounds.

In order to dispense with the use of alkalies, which are very expensive, it has been proposed to decompose the raw phosphates by heating to temperatures of over 1000° C. at the same time utilizing the favourable action of flowing flame gases and admixing substances containing silicic acid, in order completely to remove the fluorine that has been converted into gaseous form and so to secure a citrate-dissolving fertilizer. It has been found however that by this means it was not possible to decompose the raw phosphates as a practical proposition.

The invention is based upon the fact that decomposition at a white heat involves balanced reactions. At the commencement of heating of the phosphate rock balance is produced between the fluorine present in the solid or molten phase and the fluorine present in the gaseous phase. Heating of raw phosphate to incandescence in the presence of silicic acid in a closed chamber is insufficient, as experiments have repeatedly confirmed, to produce any change in the apatite.

The shifting of balance in the direction desired is possible only when the gaseous phase which is in balance with the solid or liquid phase is continuously eliminated. If a stream of gas is passed over the mixture while it is being heated, fresh fluorine passes continuously over into the gaseous phase until after some time, the period depending upon the effectiveness of the washing there is practically no fluorine left in the mixture. The fluorine can be extracted from the waste gases in known manner for example by introducing $H_2O$. Washing gases may consist of air that has been sufficiently heated obtained in the cheapest way, or suitable waste gases from furnaces. It is advantageous to use those gases which are ineffective to cause any reduction of the phosphate. Advantageously larger or smaller quantities of steam are added to the washing gas as it has been found that the use of steam accelerates the reaction to a not inconsiderable extent. It is admittedly known to use gases containing steam in the alkaline decomposition of phosphates by heating to incandescence. It has been found however that this use of gases containing steam involves a considerable acceleration in the operation of driving out the fluorine in the case of non-alkaline decomposition by heat as is employed according to the invention. This was not to be anticipated having regard to the completely different reaction with alkalies.

The gases containing fluorine, which result from the decomposition are however recombined at relatively high temperatures by the substances to be decomposed or which are already in a decomposed state. This re-absorption becomes greater and greater as the temperature falls. In connection with the reabsorption of the fluorine from the gases of decomposition containing it and its absorption by the charge in the retort, it is not merely a matter of swinging back of the balance in the sense that the fluorine driven out at high temperatures is absorbed at low temperatures in the same chemical compound, but it has actually been found that the gases containing fluorine and resulting from the process of decomposition—particularly silicon tetra fluoride—react with the lime of the decomposed material to form calcium fluoride and silicic acid. There is thus produced a kind of fluid enamel, the melting point of which lies considerably lower than the temperatures which are needed for carrying out the decomposing reaction according to the invention. This enamel which it will be understood is produced on the surface of the substances to be decomposed produces sintering and the wearing away of the pores of the grains whereby the material to be decomposed is prevented from giving up its original content of fluorine to the extent which is necessary for producing solubility.

In order to remove these disadvantages and to effect a complete decomposition of the phosphate it is proposed according to the invention during continuance of the operation of the plant to prevent the removal of the fluorine from the gases containing fluorine and which are produced during decomposition, and to prevent its re-absorption by the material to be decomposed or already decomposed for example by carrying out the heating operation in the same direction of movement as that of the material being decomposed.

The speed of reaction first increases rapidly as the temperature rises. It is therefore advantageous to carry out the heating to incandescence according to the invention at temperatures above 1000° C. When the temperature has risen to about 1400° C. the speed of reaction again drops. This seems to be due to the sintering which commences at this temperature and which reduces the amount of surface of the reacting constituents and so reduces the porosity of the material. The conversion however, by no means completely ceases even at these temperatures and the speed of conversion is very considerably affected, particularly at high temperatures after the mixture has completely melted, that is to say, at about 1600° C. and over. It may therefore be advisable to carry out the reaction only at temperatures of incandescence or to increase the reaction temperature above the melting point of the mixture according to the raw materials used. In practice it has been found to be advantageous to divide the process into the two operations of producing incandescence at temperatures lying between 1000° C. and 1200° C. and the subsequent operation of heating to temperatures between 1300° C. and 1450° C. Under these conditions using a mixture which left no residue on a sieve of 2500 mesh, it was sufficient to have a reaction period of one hour for bringing to incandescence, and one half hour for the subsequent heating operation in order to reduce the content of fluorine of a material containing about 4% of fluorine to such a low point that apatite can no longer be formed. For this purpose the fluorine content must lie below about 0.1%. Instead of the subsequent incandescence at between 1300° C. and 1450° C. melting can be effected at between 1600° C. and 1650° C.

The speed of conversion depends further in very large measure upon the dimensions of the contacting surfaces, and the speed of diffusion of the substances taking part in the reaction. For the purpose of increasing the surfaces it is advisable to employ the initial substances as extremely small grains. It is preferable to grind the phosphate rock with the additional substance together; the greater the degree of fineness of grinding the better is the result. It has been found to be highly advantageous to employ mixtures of such a degree of fineness that there is no appreciable residue left on a sieve of 2500. Under certain conditions however, the degree of fineness can be still further increased by using a sieve of 10,000 mesh leaving a residue of about 10% only. Naturally it is also possible to employ much coarser mixtures having a size of grain of 0.3 mm. or over. Under certain conditions however, a not inconsiderable lengthening of the reaction period must be taken into account. Instead of grinding the substances dry, a sludge or any other wet process may be used. This process is suitable particularly when freshly precipitated silicic acid or substances such as clay, kaolin, blast furnace slag or the like is employed as the addition instead of a finely ground sand or quartz. The silicic acid is not present in clay as such but mainly as aluminium silicate. It is however known from the experiments that have been conducted in the manufacture of porcelain and cement that clay is converted at as low a temperature as about 700° C. in such manner that probably there is present free silicic acid in addition to aluminium oxide, the silicic acid crystallites being particularly small. This smallness in the size of the grains makes the substances mentioned particularly suitable for carrying out the reaction according to the invention.

In using silicic acid as the addition substance the quantities necessary may vary within wide limits. In the case of a phosphate rock which has a natural content of 7% to 8% of silicic acid, an amount of about 15% of sand as addition is sufficient for obtaining satisfactory results. It will however be understood that smaller quantities of silicic acid will suffice but the amount of silicic acid reckoned as a whole should amount advantageously to at least 15% of the phosphate present. The quantities of silicic acid may be on the other hand raised considerably, say to about one-third of the quantity of phosphate rock employed. The amounts of silicate to be used will depend mainly upon the desired content of phosphoric acid in the final product.

A further method of accelerating the reaction consists in charging the mixture before heating to incandescence or melting with small quantities of acids such as sulphuric acid, nitric acid or hydrochloric acid. The quantities used may amount up to about 15% but in any case much less than is otherwise necessary to produce the decomposition of acid on the lines of the decomposition of super-phosphate. Furthermore for this addition phosphoric acid may be used or an acidic calcium phosphate. Naturally for special purposes such as when it is desired that the final product shall have a composition corresponding to the compound $5CaO \cdot P_2O_5 \cdot SiO_2$ other known additions particularly lime may be used.

It is advisable in practice to carry out the reaction in tubular rotary retorts in which zones of incandescence at suitable temperatures can be readily provided. In such furnaces the most suitable material for refractory lining is the raw phosphate itself which is to undergo reaction or a similar phosphate which has preferably been previously burnt up to sintering temperature, for obtaining a very low porosity.

If the liquid condition be preferred the melting operation can be carried out advantageously by heating the reaction mixture in a gas flame and collecting the drops of the melt, for example in a chamber provided for the purpose. By reason of the strong cooling action which the drops experience in falling the material from which the chamber is made is not attacked at all. Therefore under existing conditions any suitable chamber made of sheet metal can be used. When using a gas flame as hereinbefore described the burning gas itself acts as a cleanser as prescribed by the invention. The flame may be produced by stoking with powdered coal, oxyhydrogen gas, a jet of acetylene or the like. If the flame produced from a powdered coal be used it is advisable to mix the reaction mixture first with powdered coal and in this form to blow it through the flame. The guiding of the flame is at the same time advantageously so regulated that it is not possible for the phosphate to be reduced.

The advance in the art presented by the present invention over the known processes consists in the fact that for the first time it is now possible without the use of very expensive alkalies and merely by heating phosphate rock to produce in the use of sand or similarly reacting substances in the stream of gas a phosphate in which the phosphoric acid is completely converted into a form capable of use on plant life. The phosphoric acid, in the product obtained by the process according to the invention is almost completely soluble both in citric acid and in a solution of ammonium citrate. The content of fluorine, chlorine and similar substances can be reduced to such small amounts that the formation of apatite is no longer possible. At the same time to carry out the process it is by no means necessary to use unusually long reaction periods. The process renders possible the treatment of those phosphates which are particularly rich in silicic acid and fluorine and therefore have hitherto been considered very inferior. By using these inferior initial substances a very valuable fertilizer is thus obtained according to the invention by inexpensive means, and within a very short space of time.

In a modification of the invention, constructions of retort are used by means of which the gases of decomposition containing fluorine are carried away from the hot burning zone without their being able to come into contact with the material which is not yet at reaction temperature.

According to the invention furthermore a retort for carrying out the decomposition may in the first place be employed in which the temperatures of the exhaust gases are so high that it is not possible for the gases containing fluorine to be re-absorbed by the material being decomposed, because the temperature of the exhaust gases is above the turning point of the balance reaction. It will be understood that in this case it is necessary to utilize the exhaust gases in order to economize in heat, these gases being used according to the invention for preheating the reacting substances after the fluorine compounds have been removed from them. The fluorine compounds particularly silicon tetra fluoride can be removed by bringing the gases into contact with basic substances that have advantageously been preheated, for example by drawing them by suction through such materials or forcing them through, and the like. The basic substances may be compounds such as slaked lime, sodium hydroxide, alumina and the like. The resulting fluorine compounds such as calcium fluoride, sodium fluoride and the like may be used for various industrial purposes for example in metallurgy and in ceramics.

The raw phosphate which has been preheated by the exhaust gases from which fluorine compounds have been removed is then placed in the retort hereinbefore referred to. This provides the advantage that the material being decomposed already has a correspondingly high temperature on its entering the reaction retort, which prevents any considerable absorption of the exhaust gases that contain fluorine.

It will be clear that it is possible to carry out the preheating operation in a heating plant provided for the purpose independently of the exhaust gases from the reaction retort, or that the two operations may be combined.

Constructions of retort are illustrated by way of example in the accompanying drawing.

Figure 1 shows a tubular retort in longitudinal section.

Figure 2 shows in longitudinal section a retort in which the gases of decomposition are drawn off through a suction pipe.

Figure 3 shows in longitudinal section a retort in which the part of the heating flame is sucked back into the hot burning zone and Figure 4 illustrates in longitudinal section a construction involving two retorts.

In Figure 1 $m$ is a tubular rotary retort in which the material $i$ to be decomposed is introduced at the cold end $a$ of the retort through the orifice $e$ and is drawn off at the opposite end of the retort at $f$. The retort $m$ is mounted at an inclination to the horizontal on rollers $g$ which cause the retort to rotate about its longitudinal axis. By reason of the slope of the retort and the rotary movement the material travels from left to right in the direction indicated by the arrow. At the end $b$ of the retort, a powdered coal, oil, gas or like fire is provided the flame $k$ moving from right to left in the direction shown by the arrow. The tube $c$ made of a heat resisting material is secured on struts $d$ to the wall of the retort $m$. The tube $c$ is employed for drawing off the heating gases. The material $i$, which in its movement from left to right has already been preheated by the walls of the tube $c$ has its content of fluorine removed from it by the hot flame $k$ at the position $h$ so that material escapes in completely decomposed condition at $f$. The material which is to be decomposed or is already decomposed is prevented by the tube $c$ from re-absorbing fluorine from the exhaust gases that contain fluorine.

The inside of the tube $c$ may serve for feeding the retort with the material that is to be decomposed in which case the exhaust gases from the furnace will travel along the outside of the tube $c$.

To obtain a good draught fans or like devices may be provided at the end $a$ of the retort $m$.

With a view to the complete utilization of the exhaust heat in the gases it is advisable to provide tortuous paths for the gases, for the purpose of prescribing as long a path as possible for the gas.

In Figure 2 a retort is shown in which the gases of decomposition which contain fluorine are drawn off at the hot end of the retort by means of a suction pipe $l$ advantageously cooled. It will be seen from the drawing that the pipe $l$ is provided advantageously below the flame $k$ in order to intercept the fluorine which has just been decomposed directly above the material $i$.

Figure 3 shows a retort in which the lower part of the heating flame, which preferably comes into contact with the material being decomposed is sucked back into the hot burning zone. The gas or the powdered coal $n$ and the fresh air which enters at $o$ produce the flame $k$, which is divided at a position above the material being decomposed so that only the part $p$ traverses the retort above the material being decomposed, while the second part $q$ of the flame strikes back through an outlet $r$ provided on the inside of the head of the retort. The passage for strengthening the draught may advantageously be provided with a fan or the like. Here again the backwardly striking part of the flame is the part which carries along the fluorine immediately on its escaping from the material being decomposed.

Figure 4 illustrates the manner in which the decomposition of the material can be carried out in plant consisting of two separate retorts. The material $i$ which is to be decomposed enters the retort $m'$ in the usual manner at the end (at $e'$) opposite to the flame $k'$, and travels into the flame $k$ zone where the temperature is so controlled by mixing with fresh air or by similar means, that no sintering of the material occurs. The content of fluorine is in this way reduced as far as possible on account of the inevitable re-absorption of the fluorine in the colder parts of the retort, but without good solubility being secured. The material $i$ which passes out of the first retort $m'$ passes downwardly through the channel $s$, which is as short as conveniently possible, into the second retort $m''$; this retort is heated by the flame $k''$ and in it the fluorine is driven off as far as it is necessary for obtaining the high degree of solubility. The advantage of this arrangement consists in the fact that on the one hand the material which passes into the second retort $m''$ is at a temperature which no longer, or only in very small measure, allows the re-absorption of fluorine, and that on the other hand the concentration of the fluorine in the gases of this retort $m''$ is reduced by partial volatilization in the first retort $m'$. The hot gases containing fluorine which escape from the retorts can be made useful as in the first-mentioned example.

Instead of a tubular rotary retort—of the kind illustrated in the drawing—the material may be preheated by means of a travelling grate or the like similar to that used in the Dwight-Lloyd method. The use of a travelling grate, on which the material is heated by the suction through it, or by the heating gases which are forced through it, may involve special advantages for the rapid transfer of the material into the second retort.

A second action of fluorine, or gases containing fluorine, on the raw material to be subjected to decomposition may be rendered impossible by suitably reducing the concentration of the fluorine, or of the compounds containing fluorine, in the exhaust gases which contact with the material that is being decomposed. This may be effected by diluting the exhaust gases with inert gases or by removing the fluorine contained in the exhaust gases, or the fluorine compounds, by the use of suitable absorbents, particularly basic substances.

In a modification of the invention it has been found that the fluorine present in the raw phosphite, the presence of which produces the insolubility of these compounds, can be removed by heating in the presence of other additions than silicic acid or substances containing silicic acid, in the form of volatile fluorine compounds. This admits of the complete decomposition of the phosphorite. A large number of chemical compounds may be used in known manner as substances which are suitable for producing volatile fluorides. In the first place compounds of iron and aluminium may be mentioned, also titanium, boron, molybdenum, chromium, vanadium, nickel and others. The only condition that renders the substances of use for the purposes of the invention is that at the temperatures of incandescent decomposition that is to say at 1200° C. to 1500° C., it is possible to produce a fluoride, a further condition being that the fluoride formed is volatile at this temperature.

As iron and aluminium in themselves represent a frequently occurring impurity in natural raw phosphates the literature on the subject indicates to what extent the incandescent decomposition of raw phosphate is influenced by the presence of these bodies. All these earlier experiments further made use only of phosphates containing silicic acid, so that the action of iron and aluminium only when in addition to silicic acid which is also present, has been investigated. In this connection the contention has been made that small admixtures of iron and aluminium have a favourable influence upon the process of decomposition while large quantities, particularly quantities over 10% prejudice the decomposition. This contention may be true, for in the simultaneous presence of silicic acid eutectic mixtures which sinter at below the decomposition temperature and in doing have a highly prejudicial influence on the escape of fluorine, are formed from calcium phosphate in the presence of iron oxide and possibly also in the presence of aluminium oxide.

Conditions are totally different however when there is no silicic acid present. Under these conditions increasing quantities of substances such as iron oxide and aluminium oxide produce an increasingly better result in the removal of fluorine from the raw phosphate.

The process of the invention offers particular advantages in the decomposition of those phosphorites which as for example in the case of "Morocco" phosphate or the so-called "Island" phosphates have been rendered only slightly impure by the addition of silicic acid.

In this case by suitably selecting the additions it is possible to convert the fluorine contained in the raw phosphate into definite compounds whose properties are of considerable importance either for the decomposing operation itself or for recovery from the exhaust gases. Thus for instance by using aluminium oxide as the decomposing agent it is possible to secure the fluorine in a form in which it can be at once made further use of. The aluminium fluoride which sublimates during decomposition may for example be readily employed in the ceramic industry, for producing artificial cryolite and the like.

I claim:

A process for removing fluorine from phosphate rock which comprises continuously feeding a mixture consisting of comminuted phosphate rock and silica into a rotating furnace, continuously contacting said mixture with steam and hot gases of combustion to bring it to a temperature above 1000° C., and continuously withdrawing the gases, together with fluorine liberated from the phosphate, at the zone of highest temperature in such a manner as to preclude further contact of these gases with the incoming phosphate mixture and to prevent re-absorption of the fluorine by cooler portions of the moving phosphate mixture.

GERHARD TRÖMEL.